Patented Sept. 27, 1932

1,879,389

UNITED STATES PATENT OFFICE

FRITZ MIETZSCH, OF ELBERFELD, GERMANY, ASSIGNOR TO WINTHROP CHEMICAL COMPANY, INC., OF NEW YORK, N. Y., A CORPORATION OF NEW YORK

ADDITION COMPOUND OF QUINOLINES AND BARBITURIC ACIDS AND THE PROCESS OF PRODUCING SAME

No Drawing. Application filed February 26, 1929, Serial No. 342,937, and in Germany February 27, 1928.

The present invention relates to the manufacture of therapeutically valuable compounds of 5:5-di-substituted-barbituric acids with ethers of 6:8-dihydroxyquinoline, and to the new products obtainable thereby.

More particularly my invention relates to compounds of the probable general formula

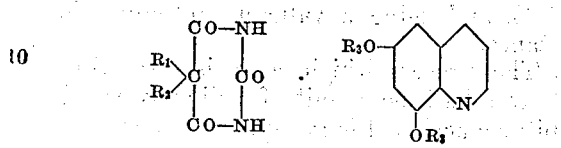

wherein $R_1$ and $R_2$ stand for alkyl- or aryl groups or for the radical of a hydroaromatic hydrocarbon, one $R_3$ stands for an alkyl group and the other $R_3$ stands for hydrogen or an alkyl group. My new products are obtainable by double decomposition in aqueous solution of equimolecular quantities of an alkali metal salt of a disubstituted barbituric acid of the formula

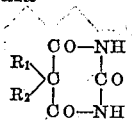

wherein $R_1$ and $R_2$ stand for alkyl- or aryl groups or for the radical of a hydroaromatic hydrocarbon, and a mineral acid salt of a 6:8-dihydroxy-quinoline ether of the formula

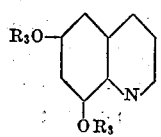

wherein one $R_3$ stands for an alkyl group and the other $R_3$ stands for hydrogen or an alkyl group.

From the reaction mixture, the new compounds separate generally in the form of a sandy powder.

In contradistinction to ordinary mixtures of the starting materials, these compounds are practically colorless, insoluble in water, of high melting point and nearly tasteless, while the barbituric acids alone are unpleasant for oral administration owing to their bitter taste and the 6:8-dihydroxyquinoline ethers owing to their anesthetic action. The new double compounds can readily be split into their components both by acids and by alkalies and readily exert their action in the human organism. They combine the sleep producing action of the barbituric acids with the antipyretic and antispasmodic properties of the 6.8-dihydroxyquinoline ethers and are valuable anti-epileptic substances.

The invention is illustrated by the following examples, but is not restricted thereto:

*Example 1.*—254 grams of the sodium salt of 5.5-phenyl-ethyl-barbituric acid are dissolved in one liter of cold water and added all at once while thoroughly stirring to a solution of 217 grams of 6.8-diethoxyquinoline in one liter of normal hydrochloric acid. The intense yellow, at first clear, solution loses its color in a few minutes during the stirring, becoming cloudy and separating the double compound in the form of a white, viscous mass. After about 10 minutes, the supernatent water is poured off, and the product is washed several times with water. After treating with ligroin for 5 minutes at 40° C., the residue crumbles into a sandy, almost colorless powder, which is filtered, washed with ligroin and finally dried in a drying oven. It contains about 52% of phenylethylbarbituric acid and 48% of diethoxyquinoline and possesses a melting point of 130° C.

On shaking the product for a prolonged time with 15% caustic soda and ether and separating the aqueous from the ethereal layer, the 6.8-diethoxyquinoline can be obtained from the ethereal layer by distillation and the crystals of the phenylethylbarbituric acid from the aqueous layer by careful acidification.

*Example 2.*—236 grams of 5.5-cyclohexenyl-ethyl-barbituric acid are dissolved in 1000 ccm. of normal caustic soda and combined with a solution of 189 grams of 6.8-dimethoxyquinoline in 1000 ccm. of normal hydrochloric acid. The double compound is isolated in the manner described in Example 1.

I claim:
1. The process which comprises reacting with an alkali metal salt of a di-substituted barbituric acid of the general formula:

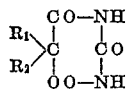

wherein $R_1$ and $R_2$ stand for substituents of the group consisting of alkyl, aryl and the radical of a hydroaromatic hydrocarbon, upon an equimolecular quantity of a mineral acid salt of a 6.8-dihydroxyquinoline ether of the general formula:

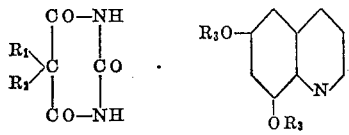

wherein one $R_3$ stands for an alkyl group and the other $R_3$ stands for hydrogen or an alkyl group, in aqueous solution.

2. The process which comprises reacting with an alkali metal salt of a di-substituted barbituric acid of the general formula:

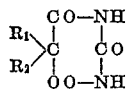

wherein $R_1$ stands for an alkyl group and $R_2$ stands for an aryl group, upon an equimolecular quantity of a mineral acid salt of a 6.8-dihydroxy quinoline ether of the general formula:

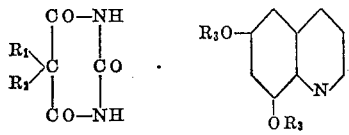

wherein $R_3$ stands for an alkyl group, in aqueous solution.

3. The process which comprises reacting with the sodium salt of 5.5-phenyl-ethyl-barbituric acid upon an equimolecular quantity of the hydrochloric acid salt of 6.8-diethoxy-quinoline, in aqueous solution.

4. As new products the compounds of the probable general formula:

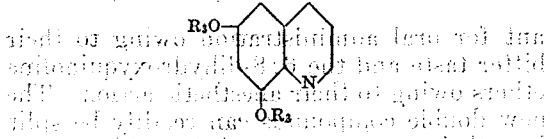

wherein $R_1$ and $R_2$ stands for substituents of the group consisting of alkyl, aryl and the radical of a hydroaromatic hydrocarbon, one $R_3$ stands for an alkyl group and the other $R_3$ stands for hydrogen or an alkyl group, said compounds being generally colorless, waterinsoluble substances of high melting point and being valuable antiepileptic substances.

5. As new products the compounds of the probable general formula:

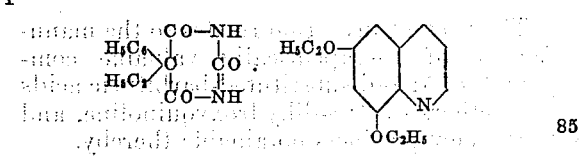

wherein $R_1$ and $R_3$ stand for alkyl and $R_2$ stands for aryl, said compounds being generally colorless, waterinsoluble substances of high melting point and being valuable antiepileptic substances.

6. As a new product the compound of the probable formula:

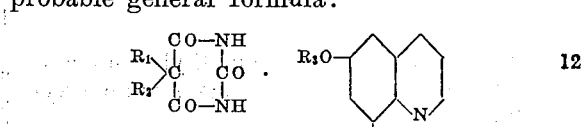

said compound being a colorless, waterinsoluble substance of a melting point of 130° C. and being a valuable antiepileptic substance.

7. The process which comprises reacting with an alkali metal salt of a di-substituted barbituric acid of the general formula:

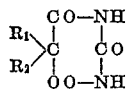

wherein $R_1$ stands for an alkyl group and $R_2$ stands for the radical of a hydroaromatic hydrocarbon, upon an equimolecular quantity of a mineral acid salt of a 6.8-dihydroxy quinoline ether of the general formula:

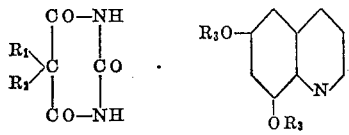

wherein $R_3$ stands for an alkyl group, in aqueous solution.

8. The process which comprises reacting with the sodium salt of 5.5-cyclohexenyl-ethylbarbituric acid upon an equimolecular quantity of the hydrochloric acid salt of 6.8-dimethoxyquinoline in aqueous solution.

9. As new products the compounds of the probable general formula:

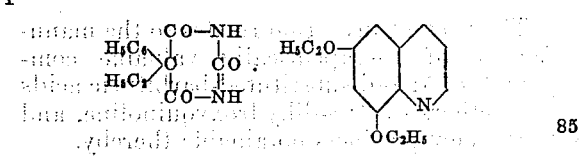

wherein $R_1$ and $R_3$ stand for alkyl and $R_2$ stands for the radical of a hydroaromatic hydrocarbon, said compounds being generally colorless, waterinsoluble substances of high melting point and being valuable antiepileptic substances.

10. As a new product the compound of the probable formula:
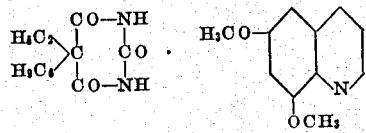
wherein the group $H_9C_6$ stands for the cyclohexenyl-radical, said compound being a colorless substance, insoluble in water.
In testimony whereof I have hereunto set my hand.
FRITZ MIETZSCH.